(12) United States Patent
Iellimo

(10) Patent No.: US 10,945,521 B2
(45) Date of Patent: *Mar. 16, 2021

(54) FORMED SUPPORT MEMBER

(71) Applicant: Frazier Industrial Company, Long Valley, NJ (US)

(72) Inventor: Domenick Iellimo, Forked River, NJ (US)

(73) Assignee: FRAZIER INDUSTRIAL COMPANY, Long Valley, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,638

(22) Filed: Jul. 22, 2020

(65) Prior Publication Data
US 2021/0022493 A1 Jan. 28, 2021

Related U.S. Application Data

(63) Continuation of application No. 16/518,061, filed on Jul. 22, 2019, now Pat. No. 10,736,415.

(51) Int. Cl.
*A47B 47/00* (2006.01)
*B65G 1/02* (2006.01)
(Continued)

(52) U.S. Cl.
CPC ...... *A47B 47/0058* (2013.01); *A47B 47/0041* (2013.01); *A47B 47/0083* (2013.01);
(Continued)

(58) Field of Classification Search
CPC . A47B 47/0058; A47B 47/027; A47B 96/021; A47B 96/1441; A47B 47/0041; A47B 47/0083; A47B 47/021; A47B 47/028; A47B 57/50; A47B 57/402; A47B 57/22; A47B 57/487; A47B 57/40; A47B 57/425; A47B 57/58; A47B 57/00; A47B 57/16; A47B 96/06; A47B 96/00; A47B 96/02; A47B 96/14; A47B 57/06; A47B 57/08; A47B 57/30; A47B 57/32; A47B 57/34; A47B 57/48; A47B 57/482; A47B 57/485; A47B 96/024; A47B 96/028; A47B 96/067; A47B 47/0025; A47B 47/024;
(Continued)

(56) References Cited

U.S. PATENT DOCUMENTS 2,047,635 A * 7/1936 Johst ...................... A47J 45/085
16/435
2,091,897 A * 8/1937 Vance ...................... B68C 1/16
54/46.1
(Continued)

*Primary Examiner* — Jennifer E. Novosad
(74) *Attorney, Agent, or Firm* — Dilworth & Barrese, LLP.

(57) ABSTRACT

A formed support member that is structurally steady and easy to manufacture is disclosed herein. The formed support member comprises a downwardly facing U-shaped body, a first flat end, a first securing tab having one end integrally connected to the first flat end and another end extended downwardly to receive at least partially a first support surface of a first supporting beam, a second flat end, and a second securing tab having one end integrally connected to the second flat end and another end extended downwardly to receive at least partially a second support surface of a second supporting beam.

20 Claims, 5 Drawing Sheets

(51) Int. Cl.
    *A47B 47/02* (2006.01)
    *A47B 96/02* (2006.01)
(52) U.S. Cl.
    CPC .......... *A47B 47/027* (2013.01); *A47B 47/028* (2013.01); *A47B 96/021* (2013.01); *B65G 1/02* (2013.01)
(58) Field of Classification Search
    CPC ....... A47B 47/045; A47B 57/20; A47B 57/38; A47B 57/404; A47B 57/406; A47B 96/1416; A47F 5/01; A47F 5/13; A47F 5/101; A47F 5/132; A47F 5/14
    USPC ....... 211/191, 192, 134, 182, 183, 189, 187, 211/186, 190, 193; 248/214, 220.21, 248/225.21, 300
    See application file for complete search history.

(56) References Cited

U.S. PATENT DOCUMENTS

| | | | | |
|---|---|---|---|---|
| 2,908,362 | A * | 10/1959 | Burtchaell | A45C 13/26 16/114.1 |
| 2,918,176 | A * | 12/1959 | Bell | A47B 47/028 211/191 |
| 2,960,238 | A * | 11/1960 | Park | A47B 47/027 211/134 |
| 2,963,170 | A | 12/1960 | Lori et al. | |
| 3,142,386 | A * | 7/1964 | Skubic | A47B 57/402 211/191 |
| 3,154,833 | A * | 11/1964 | Kimball | E04G 9/10 249/219.1 |
| 3,268,089 | A * | 8/1966 | Hall | A47B 96/021 211/153 |
| 3,349,924 | A * | 10/1967 | Maurer | A47F 7/0042 211/41.1 |
| 3,556,306 | A * | 1/1971 | Shell | A47B 96/021 211/90.02 |
| 3,563,391 | A * | 2/1971 | Weltha | H05K 7/1418 211/41.17 |
| 3,584,904 | A * | 6/1971 | Lickliter | E04B 9/122 403/252 |
| 3,846,944 | A * | 11/1974 | Lambert | A47B 47/021 52/236.3 |
| 4,048,059 | A * | 9/1977 | Evans | A47B 96/024 108/155 |
| 4,078,664 | A * | 3/1978 | McConnell | A47B 96/00 108/159 |
| 4,261,470 | A * | 4/1981 | Dolan | F16B 12/36 108/55.1 |
| 4,285,436 | A | 8/1981 | Koistant et al. | |
| 4,293,076 | A * | 10/1981 | Collin | B65D 85/185 206/289 |
| 4,665,838 | A * | 5/1987 | Minshall | A47B 47/021 108/157.13 |
| 4,801,026 | A * | 1/1989 | Andersson | A47B 96/00 211/183 |
| 4,955,490 | A * | 9/1990 | Schafer | A47B 57/581 211/187 |
| 5,279,431 | A * | 1/1994 | Highsmith | B65G 1/02 211/187 |
| 5,310,066 | A * | 5/1994 | Konstant | A47B 47/022 108/109 |
| 5,415,301 | A * | 5/1995 | Bruton | A47B 96/1416 211/183 |
| 5,628,415 | A * | 5/1997 | Mulholland | A47B 47/027 211/186 |
| 6,039,192 | A * | 3/2000 | Hollander | A47B 96/021 211/186 |
| 6,105,798 | A * | 8/2000 | Gruber | B65G 1/023 211/151 |
| 6,123,154 | A * | 9/2000 | MacDonald, III | A62C 35/68 169/16 |
| 6,151,858 | A | 11/2000 | Ruiz et al. | |
| 6,173,846 | B1 * | 1/2001 | Anderson | A47B 47/027 211/183 |
| 6,450,350 | B1 * | 9/2002 | Krummell, Jr. | A47B 47/027 211/183 |
| 6,578,720 | B1 * | 6/2003 | Wang | A47F 5/0093 211/126.15 |
| 7,614,511 | B2 * | 11/2009 | Konstant | A47B 47/021 211/189 |
| 7,641,063 | B2 * | 1/2010 | Wishart | A47B 47/027 211/189 |
| 7,779,593 | B2 | 8/2010 | Jahn et al. | |
| 7,857,152 | B2 * | 12/2010 | Smith | A47B 96/00 211/187 |
| 7,891,507 | B2 * | 2/2011 | Shetler | A47B 55/00 211/135 |
| D637,427 | S * | 5/2011 | Troyner | D6/705.6 |
| 8,117,970 | B1 * | 2/2012 | Baez | A47B 96/00 108/42 |
| 8,443,992 | B2 * | 5/2013 | Lawson | A47B 47/028 211/190 |
| 9,027,767 | B2 * | 5/2015 | Buckley | A47B 47/0083 211/134 |
| 9,215,931 | B1 * | 12/2015 | Offerman | A47B 96/02 |
| 9,290,322 | B2 * | 3/2016 | Heijmink | A47B 57/402 |
| 9,375,102 | B2 * | 6/2016 | Troyner | A47B 57/402 |
| 9,380,875 | B2 * | 7/2016 | Caldwell | A47B 96/021 |
| 9,386,855 | B2 * | 7/2016 | Sabounjian | A47B 96/14 |
| 9,834,960 | B2 * | 12/2017 | Chesterton | A63C 17/0006 |
| 10,299,594 | B2 * | 5/2019 | Liss | A47B 96/021 |
| 10,736,415 | B1 * | 8/2020 | Iellimo | B65G 1/02 |
| 10,745,198 | B1 * | 8/2020 | Iellimo | A47B 47/0041 |
| 2005/0055967 | A1 | 3/2005 | Kariakin | |
| 2010/0026156 | A1 * | 2/2010 | Leconte | A47B 96/021 312/408 |
| 2011/0042336 | A1 * | 2/2011 | Cheng | A47B 96/02 211/153 |
| 2017/0280875 | A1 * | 10/2017 | Buckley | A47B 47/021 |
| 2018/0279782 | A1 * | 10/2018 | Liss | A47B 47/021 |

* cited by examiner

FORMED SUPPORT MEMBER

This application claims priority as a continuation of U.S. Ser. No. 16/518,061, filed Jul. 22, 2019, the contents of which are incorporated herein by reference, in their entirety.

BACKGROUND

Storage systems are used in warehouses, department stores, and storage facilities to store products thereon. The storage systems containing a plurality of storage racks may hold and support large amounts and often heavy materials. Storage racks often employ a number of vertical columns that are sturdily positioned on a base or floor, and then a plurality of horizontal supporting beams may connect to and be fastened to the vertical columns. Directly above the horizontal supporting beams and substantially perpendicular to the horizontal supporting beams, a number of support members can be used to provide a storage surface for shelves, pallets, mesh, etc. All of these components operate together in order to adequately support heavy weight of the materials. For example, the support members need to be structurally steady and easy to manufacture. However, the support members may at times loosen or support so much weight that the support members begin to rotate, thereby hindering the ability of the storage rack to evenly and reliably support objects and other materials.

SUMMARY

A formed support member having a tab securing feature that is structurally steady and easy to manufacture is disclosed herein.

A formed support member comprises a downwardly facing U-shaped body elongated in an axial direction to form a storage surface, a first flat end extended from the U-shaped body in one direction along the axis and in the same horizontal plane defined by the storage surface, a first securing tab having one end integrally connected to the first flat end and another end extended downwardly to receive at least partially a first support surface of a first supporting beam, a second flat end extended from the U-shaped body in an opposite direction of the first flat end and in the same horizontal plane defined by the storage surface, and a second securing tab having one end integrally connected to the second flat end and another end extended downwardly to receive at least partially a second support surface of a second supporting beam.

DETAILED DESCRIPTION

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

Figure 1:
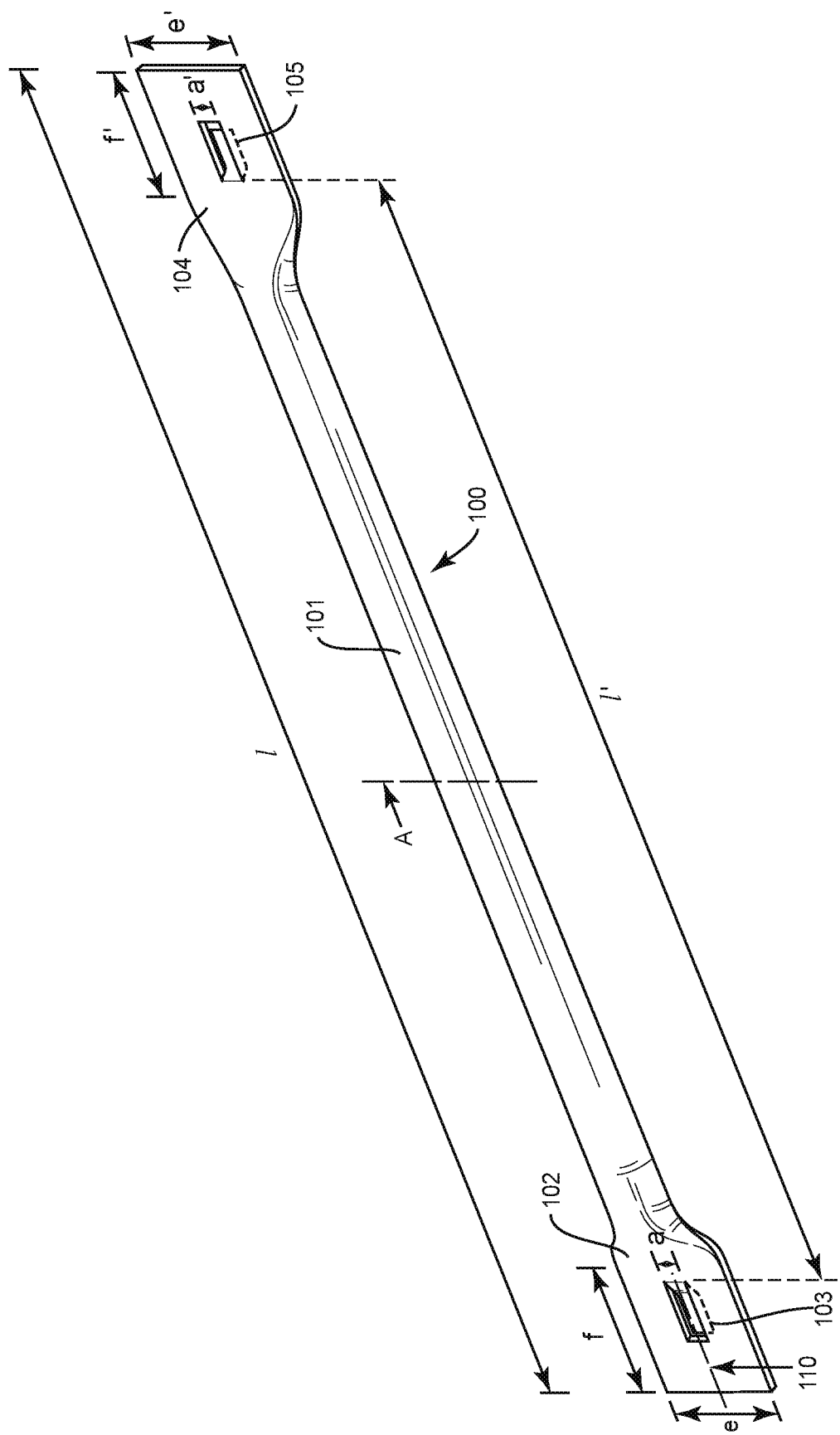
FIG. 1 illustrates a first embodiment of a formed support member of a storage rack in accordance with aspects of the present disclosure.

FIG. 1 illustrates a first embodiment of a formed support member in accordance with aspects of the present disclosure. The formed support member includes a downwardly facing U-shaped body 100 elongated in an axial direction to form a storage surface 101. A first flat end 102 extends from the U-shaped body 100 in one direction along the axis and in the same horizontal plane defined by the storage surface 101. Located in the middle of the first flat end 102 and along the center axis is a first securing tab 103 formed by punching a substantially rectangular area of the first flat end 102 downwardly leaving one end integrally connected to the first flat end 102 and another end extended downwardly to receive at least partially a first support surface of a first supporting beam.

On the opposite direction of the first flat end 102, a second flat end 104 extends from the U-shaped body 100 in the same horizontal plane defined by the storage surface 101. Located in the middle of the second flat end 104 and along the center axis is a second securing tab 105 formed by punching a substantially rectangular area of the flat end 104 downwardly leaving one end integrally connected to the second flat end 104 and another end extended downwardly to receive at least partially a second support surface of a second supporting beam.

The length l of the formed support member is defined by the shortest distance from the left end of the first flat end 102 to the right end of the second flat end 104. The length l can be any length that is suitable for the present application so that the formed support member is sufficiently long to reach the underneath support beams on both the first flat end 102 and the second flat end 104 and sufficiently strong to support the storage rack. For example, the length l can be in the range of from 2 to 44 inches, preferably, from 12 to 20 inches. The length l can be shorter or longer than the specifically recited ranges depending on the dimensions of the storage rack, the weight of the load, the material of the formed support member and other unrecited factors. Even for the same storage rack, the length l can be flexible as long as the first flat end 102 and the second flat end 104 are sufficient long to hold on to the underneath support beam.

The length l' of the formed support member is defined by the shortest distance from the intersectional line defined by the first flat end 102 and the first securing tab 103 to the intersectional line defined by the second flat end 104 and the second securing tab 105. The length l' can be any length that is suitable for the present application so that the formed support member, especially the U-shaped body 100, is sufficiently strong to support the storage rack. The length l' is by definition smaller than the length l. For example, the length l' can be in the range of from 1 to 43 inches, preferably, from 11 to 19 inches. The length l' can be shorter or longer than the specifically recited ranges depending on the dimensions of the storage rack, the weight of the load, the material of the formed support member and other unrecited factors.

The length f of the first flat end 102 is the length of the straight edge of the first flat end 102 which is parallel to the axis of the formed support member. The length f' of the second flat end 104 is the length of the straight edge of the second flat end 104 which is parallel to the axis of the formed support member. The length f and f' can be any length that is suitable for the present application. For example, the length f and f' can be in the range of from 1 to 10 inches, preferably, from 2 to 6 inches. The length f and f' can be shorter or longer than the specifically recited ranges depending on the dimensions of the storage rack, the weight of the load, the material of the formed support member and other unrecited factors.

The width e of the first flat end 102 is the length of the straight edge of the first flat end 102 which is perpendicular to the axis of the formed support member. The width e' of the second flat end 104 is the length of the straight edge of the second flat end 104 which is perpendicular to the axis of the formed support member. The width e and e' can be any length that is suitable for the present application. For example, the width e and e' are in the range of from 1 to 10 inches, and preferably, from 2 to 6 inches. The width e and e' can be shorter or longer than the specifically recited ranges depending on the dimensions of the storage rack, the weight of the load, the material of the formed support member and other unrecited factors.

The width a of the first securing tab 103 is the length of the intersectional line defined by the first flat end 102 and the first securing tab 103 which is perpendicular to the axis of the formed support member. The width a' of the second securing tab 105 is the length of the intersectional line defined by the second flat end 104 and the second securing tab 105 which is perpendicular to the axis of the formed support member. The width a and a' can be any length that is suitable for the present application. For example, the width a and a' can be in the range of from 0.1 to 2 inches, and preferably, from 0.1 to 1.5 inches. The width a and a' can be shorter or longer than the specifically recited ranges depending on the dimensions of the storage rack, the weight of the load, the material of the formed support member and other unrecited factors. In particular, large storage rack may require longer width a and a' to provide stronger support for a heavy load.

Figure 2:
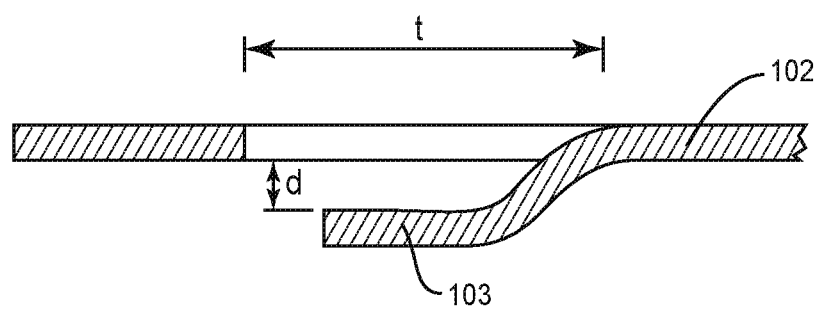
FIG. 2 illustrates one embodiment of an enlarged fragmentary section view of a first securing tab and a first flat end viewed from the direction of arrow 110 in FIG. 1.

FIG. 2 illustrates an enlarged fragmentary section view of the first securing tab 103 and the first flat end 102 viewed from the direction of arrow 110 in FIG. 1. The first securing tab 103 is formed by punching and cutting out a substantially rectangular area of the first flat end 102 downwardly. The tab has one end still integrally connected to the first flat end 102 and another end extended downwardly to receive at least partially a first support surface of a first supporting beam. The shape of the securing tab can be curved or L-shaped, see FIG. 3 which illustrates a L-shaped securing tab 106. The securing tab needs to be punched out with enough force to leave sufficient space to receive the support surface of the underneath supporting beam.

Figure 3:
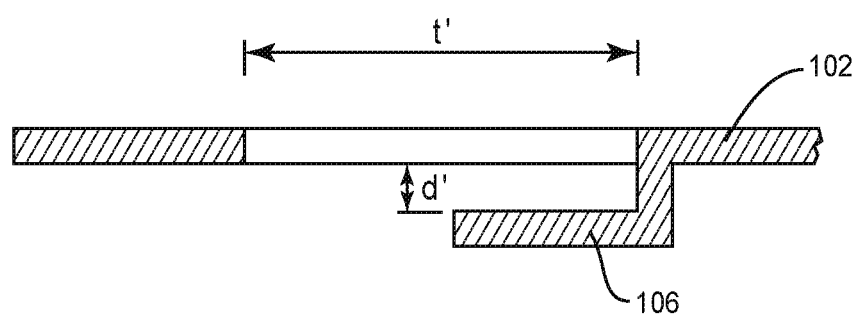
FIG. 3 illustrates another embodiment of an enlarged fragmentary section view of a first securing tab and a first flat end viewed from the direction of arrow 110 in FIG. 1.

The distance d in FIG. 2 is defined by the maximum straight distance between the securing tab 103 and the plane defined by the first flat end 102. The distance d' in FIG. 3 is defined by the maximum straight distance between the securing tab 106 and the plane defined by the first flat end 102. The distance d and d' are in the range of from 0.1 to 2 inches, and preferably, from 0.1 to 1.5 inches. The distance d and d' can be shorter or longer than the specifically recited ranges depending on the dimensions of the storage rack, the weight of the load, the material of the formed support member and other unrecited factors.

The straight length of the securing tab t in FIG. 2 and t' in FIG. 3 are defined by the straight distance between the intersectional line defined by the first flat end 102 and the first securing tab 103 and the left end of the empty space of the substantially rectangular area on the first flat end 102. The length t and t' are in the range of from 0.1 to 4 inches, and preferably, from 0.1 to 3 inches. The length t and t' can be shorter or longer than the specifically recited ranges depending on the dimensions of the storage rack, the weight of the load, the material of the formed support member and other unrecited factors.

Figure 4:
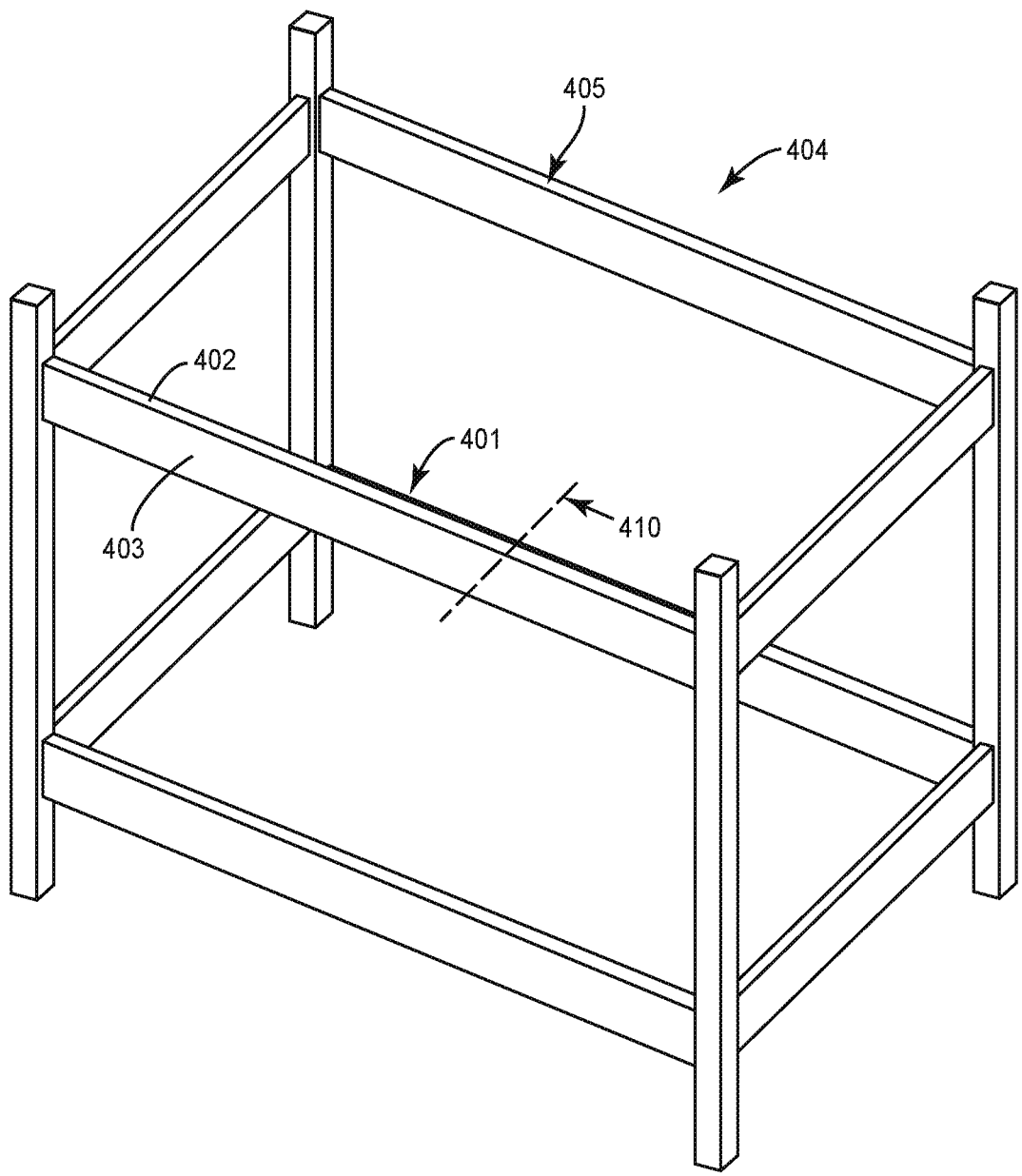
FIG. 4 illustrates a storage rack having two supporting beams on which a formed support member in accordance with aspects of the present disclosure can be used.

FIG. 4 illustrates a storage rack having two supporting beams on which a formed support member in accordance with aspects of the present disclosure can be used. The first support beam 401 has a first support surface 402 along a longitudinal axis and a first side surface 403 substantially perpendicular to the first support surface 402. The second support beam 404 has a second support surface 405 along a longitudinal axis and a second side surface (not shown in FIG. 4) substantially perpendicular to the second support surface 405.

Figure 5:
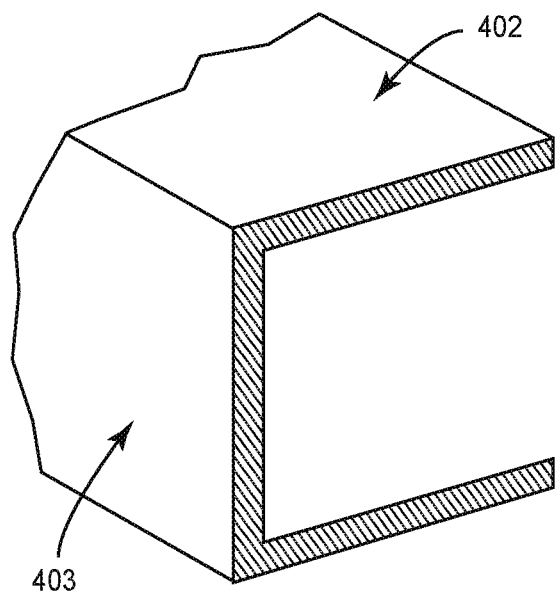
FIG. 5 illustrates an enlarged fragmentary view of a supporting beam from the direction of arrow 410 in FIG. 4.

FIG. 5 illustrates an enlarged fragmentary view of the first supporting beam 401 from the direction of arrow 410 in FIG. 4. FIG. 5 illustrates the cross-section view of the first supporting beam having the first support surface 402 and the first side surface 403.

In one embodiment of the present invention, a formed support member is first placed on top of two supporting beams at an acute or obtuse angle, then rotate to right angle so that the first supporting beam 401 is directly underneath the first flat end 102 and the second supporting beam 404 is directly underneath the second flat end 104. Once in position, the first securing tab 103 receives at least partially the first support surface 402 of the first supporting beam 401, and the second securing tab 105 receives at least partially the second support surface 405 of the second supporting beam 404. Therefore, the formed support member is securely fixed to the underneath supporting beams by two securing tabs.

Figure 6:
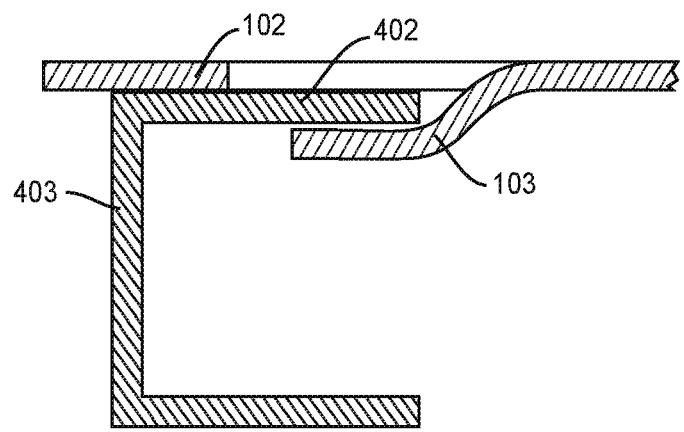
FIG. 6 illustrates an enlarged fragmentary section view of one embodiment of a supporting beam being partially embraced by a curved securing tab and a flat end.

FIG. 6 illustrates an enlarged fragmentary section view of a supporting beam being partially embraced by the curved securing tab 103 and the first flat end 102 of the formed support member. The curved securing tab is easier to manufacture, has more flexibility in receiving different supporting beam having different support surface thickness.

Figure 7:
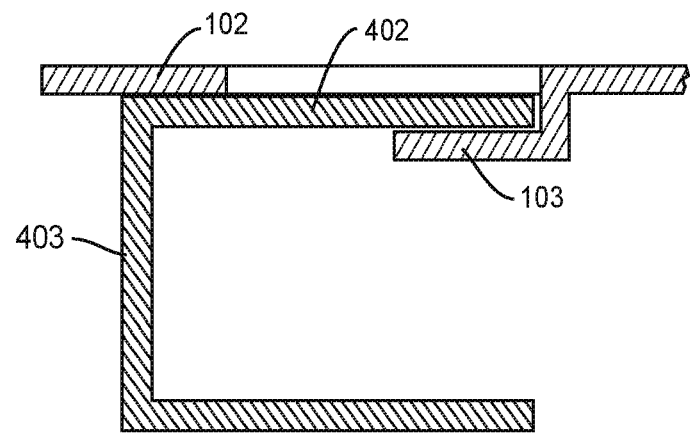
FIG. 7 illustrates an enlarged fragmentary section view of another embodiment of a supporting beam being partially embraced by a L-shaped securing tab and a flat end.

FIG. 7 illustrates an enlarged fragmentary section view of a supporting beam being partially embraced by the L-shaped securing tab 103 and the first flat end 102. The L-shaped securing tab provides tight fit between the supporting beam and the formed support member.

Figure 8:
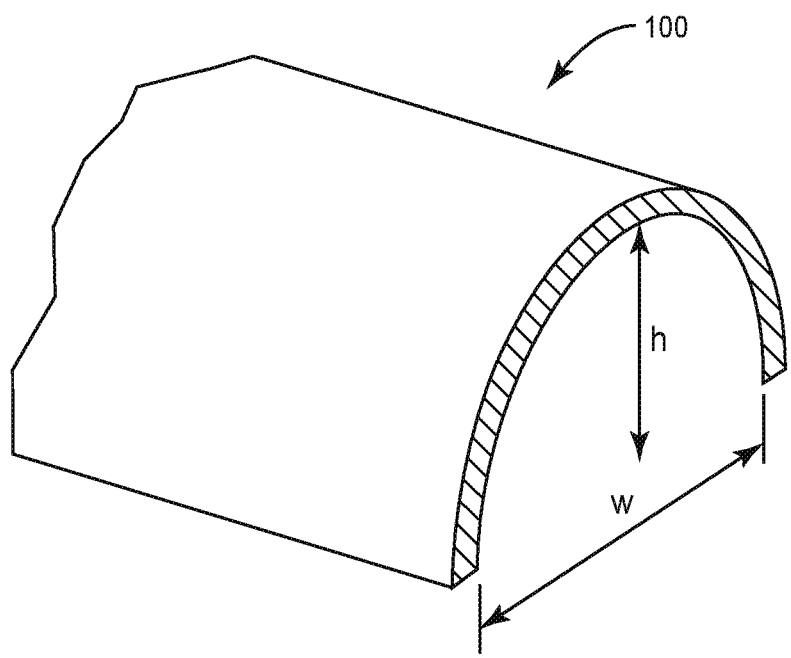
FIG. 8 illustrates a cross sectional view of a formed support member showing the U-shaped body.

FIG. 8 illustrates a cross sectional view along plane A (see FIG. 1) of a formed support member showing the downwardly facing U-shaped body. The cross section has a width w in the range of from 0.1 to 6 inches and a height h in the range of from 0.1 to 10 inches. The width w and the height h can be shorter or longer than the specifically recited ranges depending on the dimensions of the storage rack, the weight of the load, the material of the formed support member and other unrecited factors.

The formed support member can be fabricated from suitable materials, including, but not limited to, metal(s), alloy(s), or combinations thereof, etc. Suitable metals include aluminium, copper, iron, tin, lead, titanium, zinc and etc. Suitable alloys including steel, solder, brass, pewter, duralumin, bronze, amalgams and etc. The formed support member may be fabricated from a single material or a combination of materials, including, but not limited to, the above exemplary materials, to achieve various desired characteristics such as strength, rigidity, performance and durability.

The present disclosure is advantageous because the formed support member is universal in that a single structural member may be manufactured and adaptable for multiple sizes of storage racks. In particular, storage racks that have horizontal support beams that are three inches, four inches, or three and a half inches may be utilized. Thus, the ability to use the same formed support member for each sized storage rack provides for easier manufacturing and predictability in terms of making the support member.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A storage system comprising:
a storage rack comprising a horizontal first support beam having a flat first beam support surface and a horizontal second support beam having a flat second beam support surface, the first support beam and the second support beam parallel to each other;
a support member extending from the first support beam to the second support beam, the support member formed from a single piece of metal into a monolithic body having an elongated central portion having first and second ends, and a first connection portion extending from the first end at a first transition portion and a second connection portion extending from the second end at a second transition portion;
the first connection portion having a first securing tab engaging the first support beam, the tab adapted to resist movement of the first connection portions with respect to the first support beam;
the central portion formed as an inverted U-shaped body elongated in an axial direction extending from the first support beam to the second support beam, the U-shaped body having a curved, dome-shaped cross section with an upwardly pointing apex as a load bearing surface on a top side;
the first and second connection portions of the first and second ends each having a substantially flat surface disposed against the first and second support surfaces of the first and second support beams and the support member coupled to the first and second support beams and adapted such that weight placed on the load bearing surface is transferred to and supported by the support beams.

2. The storage system of claim 1, wherein the first securing tab has a curved shape.

3. The storage system of claim 1, wherein the first and second connection portions have openings formed therethrough.

4. The storage system of claim 1, wherein the second connection portion comprises anti-rotation means for resisting rotation of the support member when weight is placed on the load bearing surface.

5. The storage system of claim 4, wherein the anti-rotation means includes a tab extending from the second connection portion.

6. The storage system of claim 1, wherein the first securing tab has an L-shape.

7. The storage system of claim 1, wherein the first and second support beams are about 3-4 inches in the height dimension.

8. The storage system of claim 1, wherein the length of the support member is in the range from 12 to 20 inches and the substantially flat surface of the first and second connection portions is about 2 to 6 inches long.

9. The storage system of claim 1, wherein the support member is formed from steel.

10. The storage system of claim 1, wherein the support member is formed from aluminum.

11. The storage system of claim 1, wherein the central portion has a uniform cross section.

12. The storage system of claim 1, wherein the first and second transition portions are formed as smooth, curved portions.

13. A support member comprising:
a monolithic body formed from a single piece of metal along a first axis into an elongated central portion having first and second ends, with a first connection portion extending along the first axis from the first end at a first transition portion and a second connection portion extending along the first axis from the second end at a second transition portion, the first and second transition portions being smooth, curved and non-angular, the body adapted for use as a support between two beams of a storage rack;
the central portion formed as a downwardly facing U-shaped body elongated in an axial direction, the U-shaped body having a curved, upwardly pointing dome-shaped cross section with an apex adapted to serve as a load bearing surface on a top side, defining a load bearing plane;
the first and second connection portions having a substantially flat surface and a tab extending therefrom, adapted to be coupled to the two beams of the storage rack and prevent rotation of the respective connection portions with respect to the two beams, the first and second connection portions aligned with and being approximately within the load bearing plane.

14. The support member of claim 13, wherein the tab of the first connection portion includes a curved portion extending under the load bearing plane.

15. The formed support member of claim 14, wherein the tab of the second connection portion includes a curved portion extending under the load bearing plane and the metal is steel or aluminum.

16. The support member of claim 14, wherein the securing tab has an L-shape.

17. The support member of claim 13, having a length in the range from about 12 to 20 inches and the first and second connection ends have a length from about 2 to 6 inches.

18. The support member of claim 13, wherein the monolithic body is formed from steel.

19. The support member of claim 13, wherein the monolithic body is formed from aluminum.

20. The support member of claim 13, wherein the tabs of the first and second connection portions comprise connection means for coupling with the two beams of the storage rack and resisting rotation with respect to the beams when a load is placed on the load bearing surface.

* * * * *